(12) United States Patent
Sosnosky et al.

(10) Patent No.: US 9,037,986 B2
(45) Date of Patent: May 19, 2015

(54) ONLINE VIRTUAL SAFE DEPOSIT BOX USER EXPERIENCE

(76) Inventors: Lara M. Sosnosky, Kirkland, WA (US); Elissa E. S. Murphy, Seattle, WA (US); Navjot Virk, Bellevue, WA (US); John D. Mehr, Kenmore, WA (US); Catherine Claire Marshall, San Francisco, CA (US); Yan V. Leshinsky, Bellevue, WA (US)

( * ) Notice: Subject to any disclaimer, the term of this patent is extended or adjusted under 35 U.S.C. 154(b) by 432 days.

(21) Appl. No.: 12/408,161

(22) Filed: Mar. 20, 2009

(65) Prior Publication Data

US 2010/0241980 A1 Sep. 23, 2010

(51) Int. Cl.
*G06F 3/048* (2013.01)
*G06F 3/06* (2006.01)
*G06F 3/0486* (2013.01)

(52) U.S. Cl.
CPC ...... *G06F 3/0631* (2013.01); *G06F 2212/7208* (2013.01); *G06F 3/0486* (2013.01); *G06F 3/0607* (2013.01); *G06F 3/067* (2013.01)

(58) Field of Classification Search
CPC .............................................. G06F 2212/7208
USPC ................................................. 715/764, 769
See application file for complete search history.

(56) References Cited

U.S. PATENT DOCUMENTS

| | | | | |
|---|---|---|---|---|
| 6,055,525 | A * | 4/2000 | Nusbickel | 1/1 |
| 6,243,450 | B1 * | 6/2001 | Jansen et al. | 379/144.01 |
| 6,253,322 | B1 * | 6/2001 | Susaki et al. | 713/170 |
| 7,168,051 | B2 * | 1/2007 | Robinson et al. | 715/848 |
| 7,293,237 | B1 * | 11/2007 | Knight et al. | 715/735 |
| 7,350,209 | B2 * | 3/2008 | Shum | 718/104 |
| 7,441,277 | B2 * | 10/2008 | Burges et al. | 726/29 |
| 7,503,012 | B2 * | 3/2009 | Chen et al. | 715/769 |
| 7,631,262 | B1 * | 12/2009 | Knight et al. | 715/735 |
| 7,716,281 | B2 * | 5/2010 | Lin et al. | 709/203 |
| 7,751,807 | B2 * | 7/2010 | Lin et al. | 455/418 |

(Continued)

FOREIGN PATENT DOCUMENTS

WO WO 2007082167 A2 7/2007

OTHER PUBLICATIONS

StoreGrid Online Backup Service Provider Edition (v2.5 Beta—with MySQL 5, 32 bit)—By Vembu Technologies http://developer.amazonwebservices.com/connect/entry.jspa?externalID=1863. Last accessed Jan. 24, 2009, 8 pages.

(Continued)

*Primary Examiner* — William Titcomb
(74) *Attorney, Agent, or Firm* — Bryan Webster; Aneesh Mehta; Micky Minhas

(57) ABSTRACT

The claimed subject matter provides a system and/or a method that facilitates seamless integration of a data storage service within an operating system (OS). An online safe deposit box can store a portion of data, wherein the online safe deposit box is hosted by a data storage service provider. A local operating system associated with a device can leverage a graphic user interface (GUI) to interact with a portion of data associated with the device. A map component can create a mapped drive that integrates the online safe deposit box within the local operating system to enable seamless data interaction between the local operating system and the online safe deposit box, wherein the data interaction is at least one of a data upload from the local operating system to the online safe deposit box or a data download from the online safe deposit box to the local operating system.

20 Claims, 10 Drawing Sheets

(56) References Cited

U.S. PATENT DOCUMENTS

| | | |
|---|---|---|
| 7,779,368 B2 * | 8/2010 | Wichelman et al. ........... 715/833 |
| 8,024,400 B2 * | 9/2011 | Lin et al. ....................... 709/203 |
| 8,412,880 B2 * | 4/2013 | Leibowitz et al. ............ 711/103 |
| 2002/0129106 A1 * | 9/2002 | Gutfreund .................... 709/205 |
| 2002/0184451 A1 * | 12/2002 | Dovi .............................. 711/148 |
| 2004/0008226 A1 * | 1/2004 | Manolis et al. ............... 345/769 |
| 2005/0204063 A1 | 9/2005 | O'Brien |
| 2006/0083208 A1 * | 4/2006 | Lin ............................... 370/338 |
| 2007/0133762 A1 * | 6/2007 | Berkman ................... 379/93.01 |
| 2007/0288525 A1 | 12/2007 | Stakutis |
| 2008/0052328 A1 * | 2/2008 | Widhelm et al. ............. 707/204 |
| 2008/0065974 A1 * | 3/2008 | Campbell ..................... 715/200 |
| 2008/0072281 A1 * | 3/2008 | Willis et al. ....................... 726/1 |
| 2008/0168135 A1 * | 7/2008 | Redlich et al. ................ 709/204 |
| 2008/0184125 A1 * | 7/2008 | Suleiman et al. ............. 715/734 |
| 2008/0184148 A1 * | 7/2008 | Selig ............................. 715/769 |
| 2008/0195712 A1 * | 8/2008 | Lin et al. ....................... 709/206 |
| 2008/0244039 A1 | 10/2008 | Wertz |
| 2008/0270159 A1 * | 10/2008 | Constable et al. ................ 705/1 |
| 2009/0083646 A1 * | 3/2009 | Lin et al. ....................... 715/769 |
| 2009/0150417 A1 * | 6/2009 | Ghods et al. .................. 707/100 |
| 2009/0228447 A1 * | 9/2009 | Creekbaum et al. .............. 707/3 |
| 2009/0228819 A1 * | 9/2009 | McDermott .................. 715/769 |
| 2009/0241043 A9 * | 9/2009 | Balthaser ...................... 715/763 |
| 2009/0313261 A1 * | 12/2009 | Corella ........................... 707/10 |
| 2010/0229243 A1 * | 9/2010 | Lin et al. ......................... 726/27 |

OTHER PUBLICATIONS

Jon Brodkin, EMC Merges Home Backup with Cloud-based Storage http://www.computerworld.com/action/article.do?command=viewArticleBasic&articleId=9110246. Last accessed Jan. 24, 2009, 6 pages.

Windows MAC and Linux Online Backup http://cloudbackup.openrsm.com/pages/about.php. Last accessed Jan. 24, 2009, 2 pages.

Box.Net is the Easiest Way to Share and Manage your Files Online http://box.net/ Last accessed Jan. 24, 2009, 2 pages.

Symantec Online Backup http://www.symantec.com/business/online-backup. Last accessed Jan. 24, 2009, 1 pages.

* cited by examiner

ONLINE VIRTUAL SAFE DEPOSIT BOX USER EXPERIENCE

BACKGROUND

A large and ever-growing amount of computer software is readily available to consumers in light of a dramatic increase in use, demand, availability, and decrease in cost associated with computers. Based on such a vast and broad functionality associated with computers, computer software exists for essentially any market, activity, computation, and/or computer-related implementation. For instance, software can be related to accounting, word processing, data management, electronic mail message, virus protection, data synchronization, digital photograph manipulation, media management, Operating Systems (OS), update control, audio, graphic design, architecture, taxes, browsers, document readers, games, communications, security, networking, etc.

With the advent of highly sophisticated computer software and/or hardware, servicing areas associated therewith have emerged in order to meet consumer high-demands. Typically, computational services are undertaken upon a client or within a proprietary intranet. Client-side systems are employed to manage relationships between users, software applications, services, and hardware within a client machine, as well as data resident upon a respective intranet. However, in addition to client-side systems providing services, off-site systems (e.g., third party) can also provide services in order to improve data capability, integrity, reliability, versioning, security, and mitigate costs associated therewith.

In general, these services can be employed to manage relationship between users, provide software applications, enhance hardware capabilities, manage data, optimize security, etc. For example, a third party service can enable a client to store data therewith limited solely by the third party capabilities (e.g., hardware, software, etc.). In particular, the off-site or remote data storing services enable users to access data storage via the Internet or the web for data upload or download. Typical off-site or online service storage providers require users or clients to sign into a website to manage stored data, wherein such logging in process can be time-consuming and inconvenient for data management.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate seamless integration of a data storage service within an operating system (OS). A map component can create a mapped drive that links a remote safe deposit box (e.g., online storage managed by an online storage service provider) to an operating system in order to enable data access or interaction. In other words, the map component can employ a mapping between the operating system and the remote safe deposit box in order to interact with the safe deposit box as if a local drive or connection. Moreover, the map component can transfer data between the mapped drive within the operating system and the safe deposit box without repetitive requirements associated with a data storage service provider that manages the online safe deposit box.

Furthermore, the subject innovation can leverage a file manager associated with the operating system in order to explore data files stored locally with the operating system as well as data stored remotely on the online safe deposit box. Thus, the subject innovation can seamlessly integrate the contents or data hosted by the remote safe deposit box such that remote data can be accessed substantially similar to local data. The data (e.g., remote data within the safe deposit box, local data on a device utilizing the operating system, etc.) can be viewed, edited, deleted, created, moved, copied, etc. In other aspects of the claimed subject matter, methods are provided that facilitate integrating an online data storage system with a local operating system (OS).

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
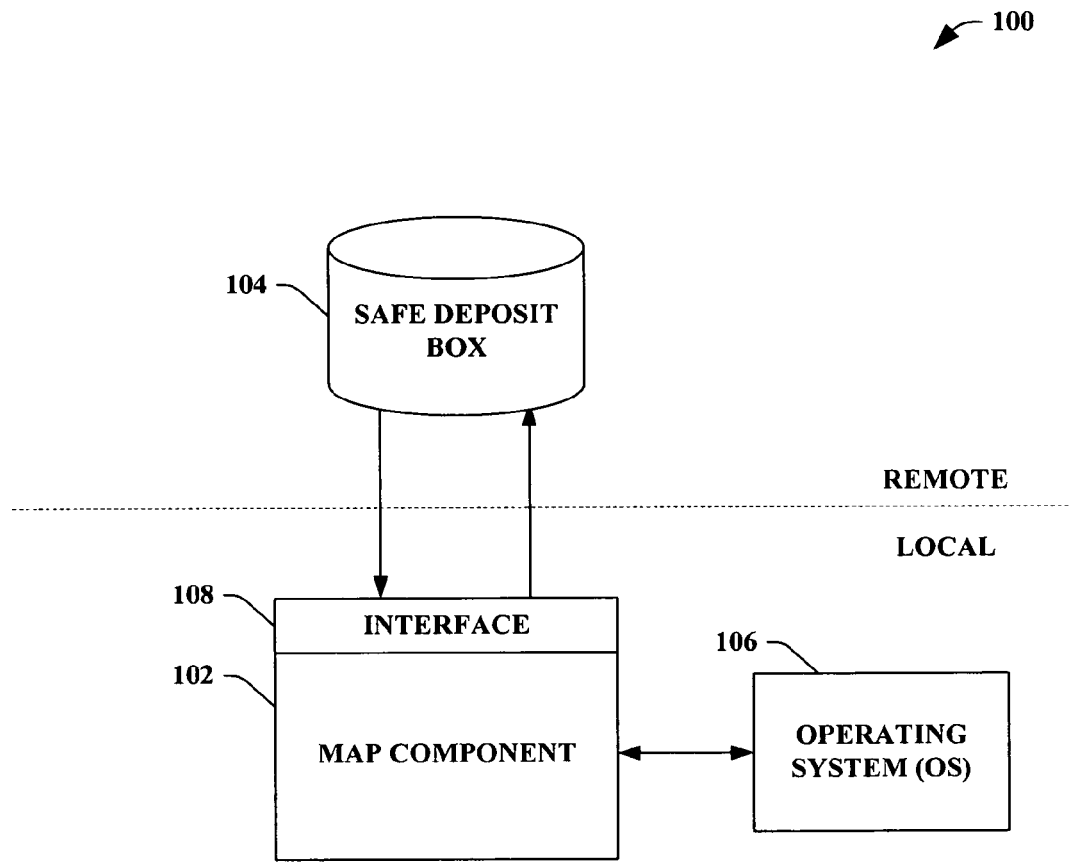
FIG. 1 illustrates a block diagram of an exemplary system that facilitates integrating an online data storage system with a local operating system (OS).

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "safe deposit box," "manager," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates integrating an online data storage system with a local operating system (OS). The system 100 can include a map component 102 that can enable seamless interaction with a safe deposit box 104. In general, the map component 102 can integrate accessibility of the safe deposit box 104 into an operating system (OS) 106. In other words, the map component 102 can enable the operating system (OS) 106 to access the safe deposit box 104. The map component 102 can link the safe deposit box 104 to the operating system (OS) 106 in order to allow data communications there between. Thus, data can be uploaded to the safe deposit box 104 from the operating system (OS) 106 and data can be downloaded from the safe deposit box 104 from the operating system (OS) 106 without repetitive requirements and restrictions of traditional online service providers (e.g., website access, server access, network access, log in procedures, username, passwords, etc.). It is to be appreciated that the map component 102 can establish a connection to the safe deposit box 104 and/or a service provider for such safe deposit box 104 in order to provide a portion of data (e.g., a username, a password, data related to log-in or verification) on behalf of a user in order to upload/download for the safe deposit box 104. However, the system 100 and the map component 102 enable such interaction to be implemented automatically and in the background so that the safe deposit box 104 appears to be a mapped drive (e.g., local drive). Moreover, it is to be understood that the system 100 eliminates the requirement for a manual sign-in to a website associated with traditional backup or online data storage service providers. It is to be appreciated that the map component 102 can integrate the remote safe deposit box 104 into the local operating system 106 such that remote interaction (e.g., data access, data upload, data download, etc.) with the safe deposit box 104 appears to be a local connection (e.g., a local drive, etc.).

For example, the map component 102 can evaluate settings and/or configuration associated with the remote safe deposit box 104 such as, but not limited to, host, service provider, host address, Internet Protocol (IP) address, account information (e.g., safe deposit box size, contract length, etc.), local address for the operating system 106, remote address for the safe deposit box, username, password, security settings, etc. Based on such evaluated settings and/or configurations, the map component 102 can link the safe deposit box 104 to the operating system 106 in order to provide connectivity as if the safe deposit box is a local storage drive.

The operating system (OS) 106 can be any suitable operating system that leverages a graphical user interface (GUI). For example, the operating system (OS) 106 can be, but is not limited to being a GUI-based operating system (OS), a GUI shell operating system (OS), a 32-bit operating system, a 64-bit operating system, a GUI-based operating system that can be remotely utilized (e.g., cloud-based, etc.), data synchronization operating system (OS) that leverages a GUI and enables sharing of data across multiple devices, and/or any other suitable operating system (OS) that can map a network drive for integrated accessibility. Moreover, the operating system 106 can include any suitable file manager, search engine, exploring component, and the like in order to search data, view data, edit data, delete data, create data, move data, copy data, and/or any other suitable interaction data capable of the operating system 106.

The safe deposit box 104 can be any suitable online data storage that can store data. Furthermore, the safe deposit box 104 can enable a user to upload data to the safe deposit box 104 as well as download data from the safe deposit box 104. It is to be appreciated that the safe deposit box 104 can be substantially similar to an electronic form of a bank deposit box. For example, a bank deposit box enables designated individuals to access (e.g., store or retrieve) physical items from a secure location, whereas the safe deposit box 104 can be an electronic medium or storage medium in a remote location that enables designated individuals to access data (e.g., upload or download) via a machine (e.g., computer, laptop, portable digital assistant (PDA), mobile device, smartphone, cellular device, a portable gaming device, a media player, a web browser, a device that leverages an operating system, etc.). Moreover, the safe deposit box 104 can be remote in comparison to the local operating system 106. Thus, the safe deposit box 104 can be located on a remote server, on a remote network, online, on the Internet, etc.

In addition, the system 100 can include any suitable and/or necessary interface component 108 (herein referred to as "the interface 108"), which provides various adapters, connectors, channels, communication paths, etc. to integrate the map component 102 into virtually any operating and/or database system(s) and/or with one another. In addition, the interface 108 can provide various adapters, connectors, channels, communication paths, etc., that provide for interaction with the map component 102, the safe deposit box 104, the operating system 106, and any other device and/or component associated with the system 100.

Figure 2:
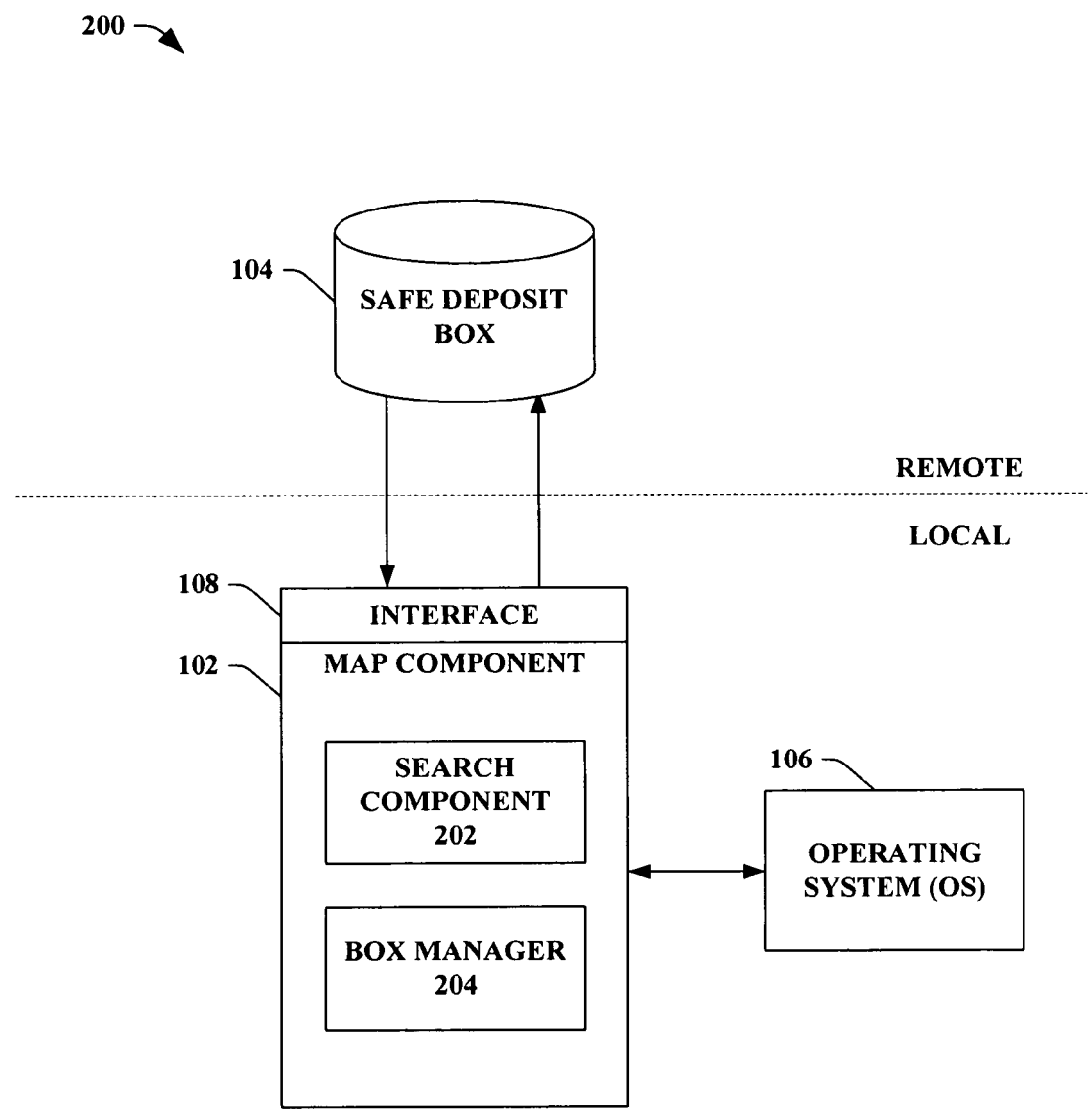
FIG. 2 illustrates a block diagram of an exemplary system that facilitates seamlessly incorporating an online data store into an operating system (OS) in which management for data and the online data store can be employed.

FIG. 2 illustrates a system 200 that facilitates seamlessly incorporating an online data store into an operating system (OS) in which management for data and the online data store can be employed. The system 200 can include the map component 102 that can link the safe deposit box 104 that is remote to a local operating system 106 in which such linkage can provide seamless interaction with the safe deposit box 104 (e.g., remote data store, etc.). In other words, the remote safe deposit box 104 can be integrated into the operating system 106 by the map component 102 in order to allow data manipulations (e.g., data upload, data download, data edit, etc.) as if the safe deposit box 104 was a local drive or connection. It is to be appreciated that the map component 102 can reside on the remote side, on the local side, and/or any suitable combination thereof.

For example, a safe deposit box 104 hosted by an online storage service provider can be integrated into an operating system associated with a device, wherein such integration can map or link the remote safe deposit box 104 to the local device and operating system allowing communications to the safe deposit box 104 without repetitive host requirements (e.g., accessing a website associated with the host, interacting with a network associated with the host, accessing a server associated with the host, host-related username input, host-related password input, etc.). It is to be appreciated that the map component 102 can establish a connection to the safe deposit box 104 and/or a service provider for such safe deposit box 104 in order to provide a portion of data (e.g., a username, a password, data related to log-in or verification) on behalf of a user in order to upload/download for the safe deposit box 104. However, the system 100 and the mapping component 102 enable such interaction to be implemented automatically and in the background so that the safe deposit box 104 appears to be a mapped drive (e.g., local drive). With the safe deposit box 104 integrated into a portion of the operating system 106, a user can interact with the safe deposit box 104 utilizing a mapping. For instance, the mapping can be from the safe deposit box 104 to a portion of a graphic (e.g., icon, shortcut, etc.) within the operating system 106. The portion of the graphic can be mapped such that the mapping provides a direct communication channel that enables interaction with the safe deposit box 104 via the operating system 106 and the portion of the graphic.

The system 200 can include a search component 202 that can employ data management for the operating system 106 and the integrated safe deposit box 104. The search component 202 can enable a user to view and manage (e.g., create, delete, read, copy, move, edit, etc.) data stored locally with the operating system 106, drives/data linked/mapped to the operating system, and/or information or data associated with the safe deposit box 104 that is mapped or linked to the operating system 106. The search component 202 can be a file manager or exploration component that can enable data properties to be viewed (e.g., location, file paths, size, date created, etc.). Moreover, the search component 202 can query data associated with the operating system 106 as well as data included with the linked safe deposit box 104. Based at least in part upon the mapping or linkage provided by the map component 102, the safe deposit box 104 can be viewed and managed by the search component 202. In other words, the file management features enabled by the search component 202 can be utilized with the remote, yet locally linked, safe deposit box 104. For example, the search component 202 can display local data related to the operating system 106 as well as data included with the remote safe deposit box 104 (based upon such linkage).

The system 200 can further include a box manager 204 that can manage the safe deposit box 104. The box manager 204 can configure settings associated with the safe deposit box 104 leveraging the mapping or linkage provided by the map component 102. In general, the box manager 204 can enable a user to configure and personal settings associated with the safe deposit box 104 without repetitive host requirements (e.g., accessing a website associated with the host, interacting with a network associated with the host, accessing a server associated with the host, host-related username input, host-related password input, etc.). It is to be appreciated that the map component 102 can establish a connection to the safe deposit box 104 and/or a service provider for such safe deposit box 104 in order to provide a portion of data (e.g., a username, a password, data related to log-in or verification) on behalf of a user in order to upload/download for the safe deposit box 104. However, the system 200 and the map component 102 enable such interaction to be implemented automatically and in the background so that the safe deposit box 104 appears to be a mapped drive (e.g., local drive). The box manager 204 can enable a user to adjust or configure settings such as, but not limited to, quota management (e.g., increase storage amount, decrease storage amount, etc.), contract/service adjustments (e.g., account history, type of service, extend contract service agreement, decrease contract service agreement, etc.), billing settings (e.g., payments, fees, account information, payment type, bank information, credit card information, etc.), personal information (e.g., address, contact preference, notification settings, username, passwords, contact information, email address, etc.), data storage settings (e.g., automatic backup settings, types of data to store, sharing settings, security, data storage allocation, etc.), mapping/linking settings (e.g., enable operating system mapping, disable operating system mapping, devices authorized to map to the safe deposit box, etc.), and the like.

The system 200 can provide users with perpetual archiving to the safe deposit box 104 and guarantee safe storage forever. The safe deposit box 104 can be implemented on top of the perpetual archive system for users to manage digital data. The system 200 can integrate the safe deposit box 104 within the core operating system 106 experience, within the safe deposit box 104, and/or any suitable combination thereof for ease of access and use. The safe deposit box 104 can appear as a mapped drive to end users and support drag-and-drop features in all user interfaces. Such features can enable user to drag files and folders that are to be stored in the online storage (e.g., the safe deposit box 104). The system 200 can enable the following integrations within the operating system (OS) 106: within a search component/application as a mapped drive; on a local machine workspace (e.g., computer desktop, laptop workspace, etc.); within a backup application (e.g., a cloud backup application, etc.); or within a data synchronization operating system that shared data across multiple devices.

The system 200 can further enable a user to interact with the safe deposit box 104 in a search component/application that enables file management (e.g., search component 202). The interaction can be substantially similar to a local mapped drive, mapped folder, mapped location, local drive, etc. The users can drag-and-drop in files and folder such that those items (e.g., portions of data) are directly put into the cloud store (e.g., remote location, online safe deposit box 104, etc.). The users can select the safe deposit box 104 within a file manager application/component (e.g., search component 202) to view and manage (e.g., create, delete, read, copy, move, edit, etc.) the contents on their online archives. The safe deposit box 104 can further be linked or mapped to a local device (e.g., desktop, workspace, etc.) with the drag-and-drop management features. The safe deposit box 104 can further be mapped to a data synchronization operating system that shares data across multiple devices or users. Furthermore, users can leverage the subject innovation to add/delete/view files in the safe deposit box 104 and extend the quota associated therewith.

Figure 3:
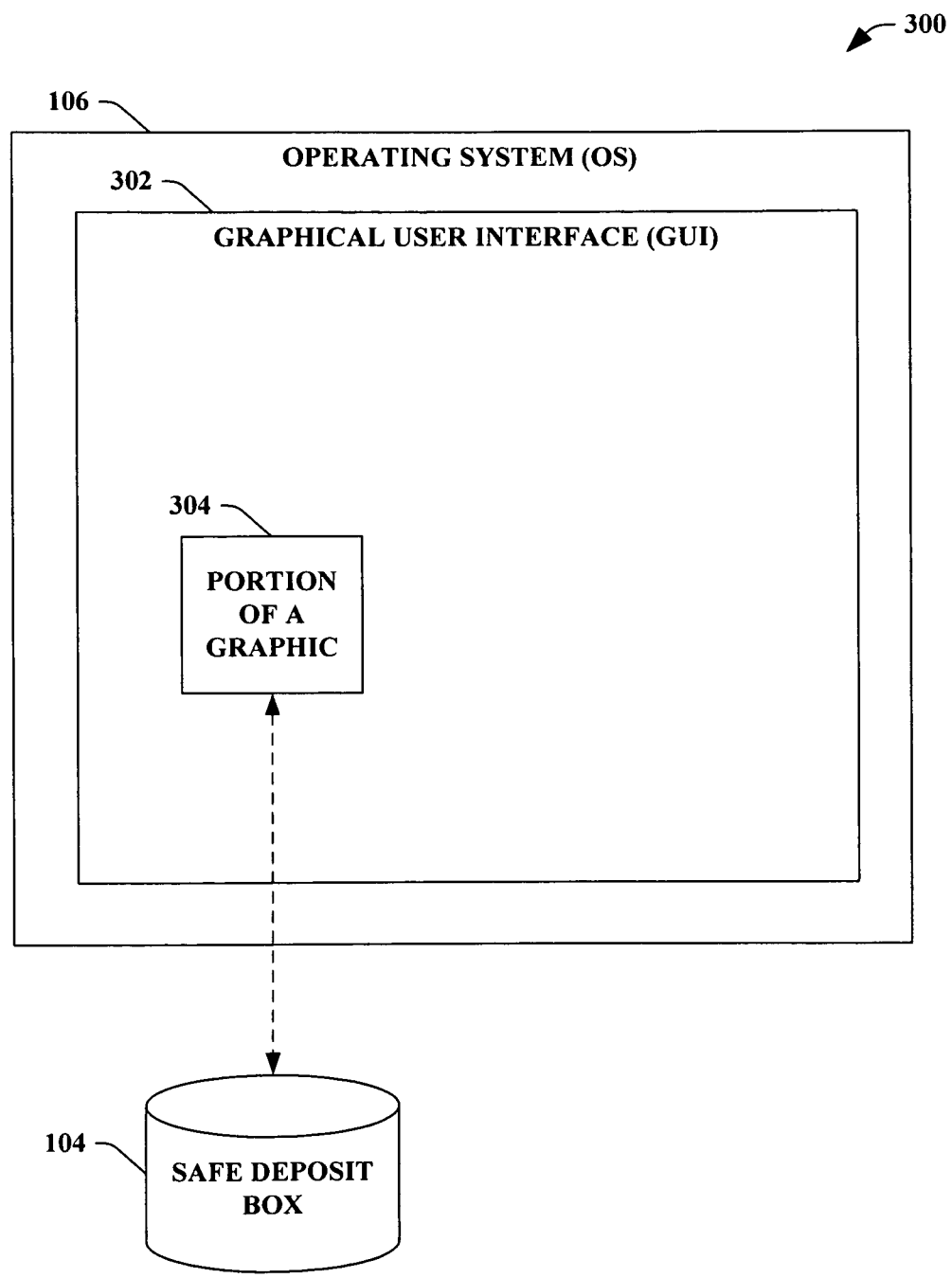
FIG. 3 illustrates a block diagram of an exemplary system that facilitates utilizing a portion of a graphic associated with an operating system (OS) to link to an online data safe deposit box.

FIG. 3 illustrates a system 300 that facilitates utilizing a portion of a graphic associated with an operating system (OS) to link to an online data safe deposit box. The map component (not shown) can integrate the safe deposit box 104 into the operating system 106 in order to allow user interaction with such safe deposit box 104 hosted by a data storage service provider, wherein such interaction does not require repetitive access to the at least one of a website related to the data storage service provider, service related to the data storage service provider, and/or network related to the data storage service provider. It is to be appreciated that the map component (not shown) can establish a connection to the safe deposit box 104 and/or a service provider for such safe deposit box 104 in order to provide a portion of data (e.g., a username, a password, data related to log-in or verification) on behalf of a user in order to upload/download for the safe deposit box 104. However, the system 300 and the map component (not shown) enable such interaction to be implemented automatically and in the background so that the safe deposit box 104 appears to be a mapped drive (e.g., local drive). By linking the safe deposit box 104 to the operating system 106 utilizing mapping techniques, the remote safe deposit box 104 can be employed as a virtual and local mapped drive within the operating system 106.

The system 300 can further include the safe deposit box 104, wherein the safe deposit box 104 can be an online data store that is maintained by a service. For example, a storage service provider can provide an amount of storage to a user that is accessible via a remote connection. The service provider can utilize a safe deposit box 104 or a data store that can be utilized remotely or online for data storage. The safe deposit box 104 or data store can be utilized by a user to store any suitable data such as, but not limited to, personal files, media (e.g., pictures, music, video, etc.), documents, word processing documents, passwords, security data, digital data, archival data, spreadsheets, legal documents, audio files, graphic files, text files, email data, calendar data, address information, contact information, programs, etc.

It is to be appreciated that the data store or safe deposit box 104 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store or safe deposit box 104 of the subject systems and methods is intended to comprise, without being limited to, these and any other suitable types of memory. In addition, it is to be appreciated that the data store or safe deposit box 104 can be a server, a database, a hard drive, a pen drive, an external hard drive, a portable hard drive, and the like.

The system 300 can include the operating system (OS) 106 that can leverage any suitable graphic user interface (GUI) 302. The GUI 302 can be utilized by a user in order to interact with data associated with at least one of the operating system 106 or the safe deposit box 104. Moreover, the GUI 302 can include a portion of a graphic (e.g., icon, shortcut, image, etc.) 304 that can be linked or mapped to the remote safe deposit box 104. In other words, the portion of the graphic 304 can be representative of the remote safe deposit box 104, wherein interaction with the safe deposit box 104 can be implemented by interaction with the portion of the graphic 304. For example, a property (e.g., size, location, data storage service provider, items stored, etc.) of the safe deposit box 104 can be obtained by requesting such property of the portion of the graphic 304. In another example, data access or interaction with the safe deposit box 104 can be implemented with the portion of the graphic 304 (discussed below).

Figure 4:
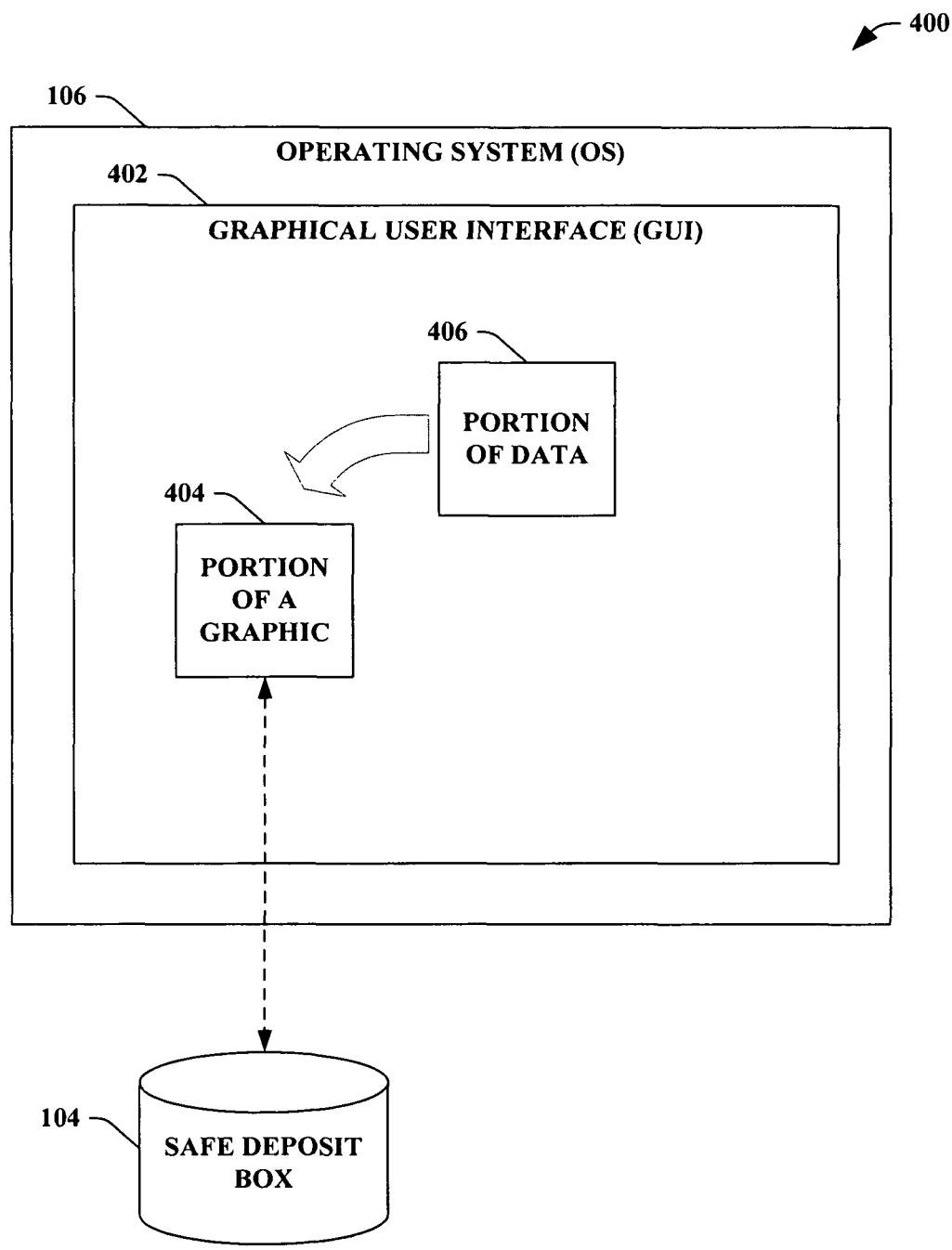
FIG. 4 illustrates a block diagram of an exemplary system that facilitates employing a drag-and-drop feature to enable seamless data transfer from an operating system (OS) to an online safe deposit box.

FIG. 4 illustrates a system 400 that facilitates employing a drag-and-drop feature to enable seamless data transfer from an operating system (OS) to an online safe deposit box. The system 400 can include a map component (not shown) that can enable the safe deposit box 104 to be seamlessly incorporated into the operating system 106 and, in turn, a graphical user interface (GUI) 402 associated with the operating system 106. The safe deposit box 104 can be a remote data store related to an online data storage service provider that can enable a user to utilize remote data storage by accessing the service provider website, server, and/or network. However, the subject innovation enables such remote safe deposit box 104 to be integrated within the operating system 106 such that the remote safe deposit box 104 can be mapped and implemented as a local connection and/or drive/storage.

The operating system 106 can include the GUI 402 that enables a user to interact with any suitable portion of data (e.g., files, application, software, browser, file manager, etc.) associated with the operating system 106. The map component can employ a portion of a graphic (e.g., an icon, a shortcut, an image, a local address on a local disk, etc.) 404 to represent the remote safe deposit box 104. In other words, interaction or data access related to the safe deposit box 104 can be implemented via the portion of the graphic 404 since the portion of the graphic 404 can be mapped to the safe deposit box 104. For example, a portion of data 406 can be copied or stored to the safe deposit box based upon a drag-and-drop feature, wherein the portion of data 406 is maneuvered and placed onto the portion of the graphic 404. Such action can trigger the portion of data to be copied or moved to the remote safe deposit box 104. In another example, the portion of the graphic 404 can be utilized to explore data stored within the safe deposit box 104. In still another example, the portion of the graphic 404 can be utilized to download data from the remote safe deposit box 104 to the operating system 106 and/or local storage system.

Figure 5:
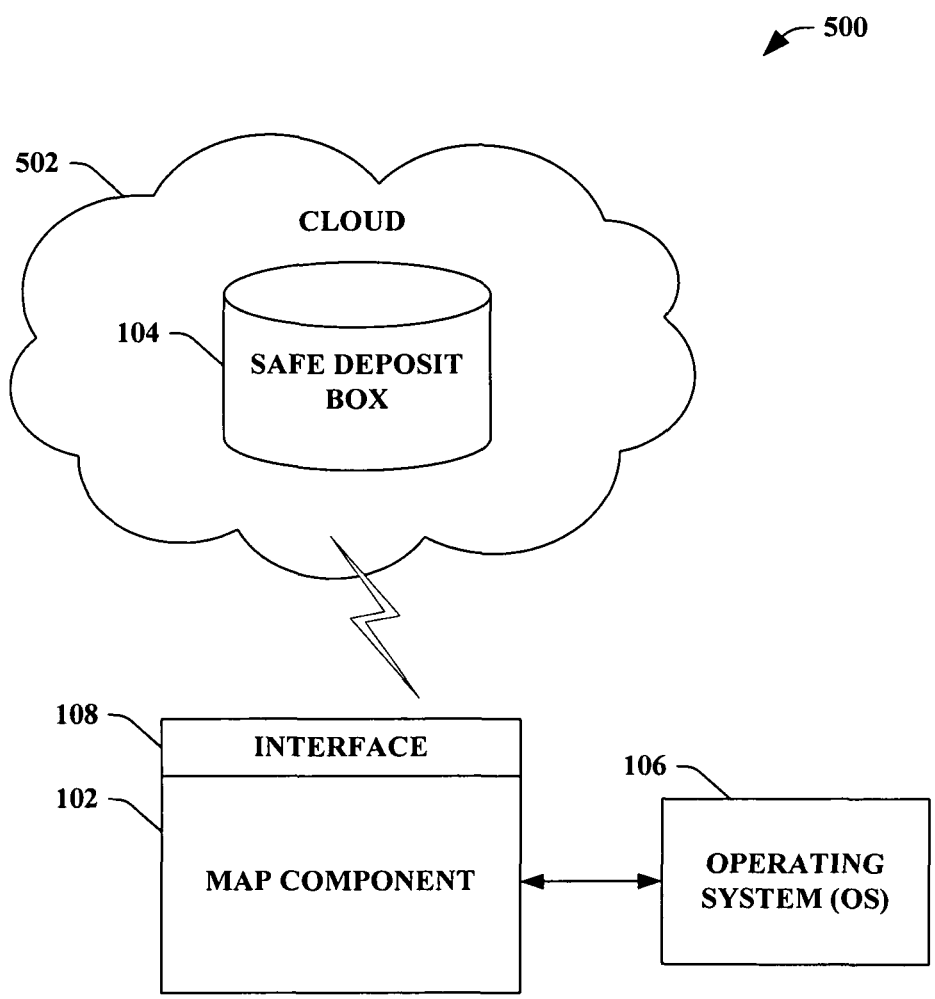
FIG. 5 illustrates a block diagram of exemplary system that facilitates enhancing interaction with an online data store leveraging cloud or remote techniques.

FIG. 5 illustrates a system 500 that facilitates enhancing interaction with an online data store leveraging cloud or remote techniques. The system 500 can further utilize a cloud 502 that can incorporate at least one of the safe deposit box 104, the map component 102, or the interface 108, and/or any suitable combination thereof. It is to be appreciated that the cloud 502 can include any suitable component, device, hardware, and/or software associated with the subject innovation. The cloud 502 can refer to any collection of resources (e.g., hardware, software, combination thereof, etc.) that are maintained by a party (e.g., off-site, on-site, third party, etc.) and accessible by an identified user (not shown) over a network (e.g., Internet, wireless, LAN, cellular, Wi-Fi, WAN, etc.). The cloud 502 is intended to include any service, network service, cloud service, collection of resources, etc. and can be accessed by an identified user via a network. For instance, two or more users can access, join, and/or interact with the cloud 502 and, in turn, at least one of the safe deposit box 104, the map component 102, or the interface 108, and/or any suitable combination thereof. In other words, a remote user can connect to the safe deposit box 104 via a remote connection in order to enable remote data access. Moreover, the map component 102 can enable seamless integration of the safe deposit box 104 into the operating system (OS) 106. In addition, the cloud 502 can provide any suitable number of service(s) to any suitable number of user(s) and/or client(s). In particular, the cloud 502 can include resources and/or services that integrate the online safe deposit box 104 into the operating system 106.

Figure 6:
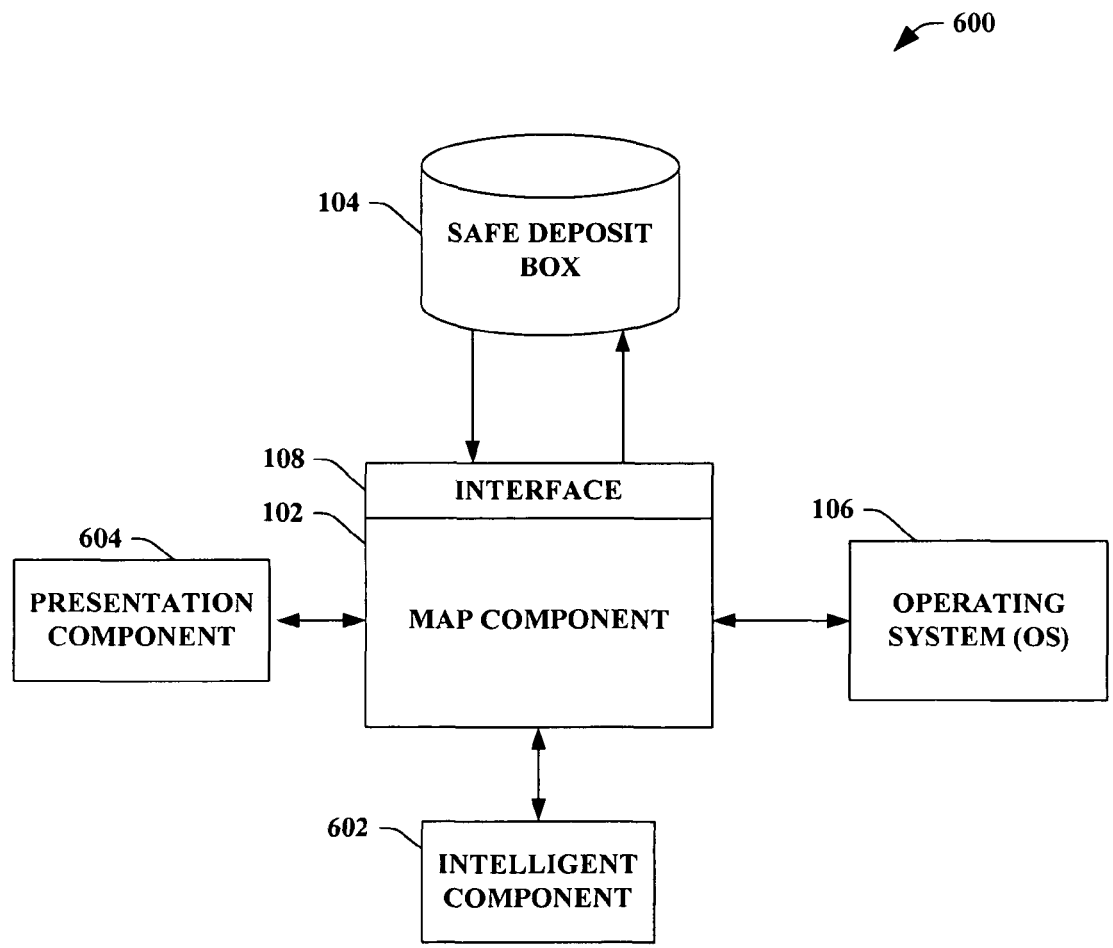
FIG. 6 illustrates a block diagram of an exemplary system that facilitates employing seamless operating system (OS) access with a remote safe deposit box.

FIG. 6 illustrates a system 600 that employs intelligence to facilitate employing seamless operating system (OS) access with a remote safe deposit box. The system 600 can include the map component 102, the safe deposit box 104, the operating system (OS) 106, and the interface 108, which can be substantially similar to respective components, boxes, systems and interfaces described in previous figures. The system 600 further includes an intelligent component 602. The intelligent component 602 can be utilized by the map component 102 to facilitate incorporating the safe deposit box 104 into the operating system 106. For example, the intelligent component 602 can infer mapping information, safe deposit box location, Internet Protocol (IP) addresses, usernames, passwords, service providers for safe deposit box, security information, mapped drive information (e.g., drive letter, drive reference, reference, naming, etc.), safe deposit box management aspects (e.g., maintenance, service, fees, available space, contract information, etc.), search queries, automatic complete for partially received query, operating system (OS) settings/configuration, etc.

The intelligent component 602 can employ value of information (VOI) computation in order to identify appropriate mapping between the operating system 106 and the safe deposit box 104. For instance, by utilizing VOI computation, the most ideal and/or appropriate mapping can be determined in order to enable an appropriate safe deposit box to be mapped to a particular user and respective operating system (OS) on a machine. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The map component 102 can further utilize a presentation component 604 that provides various types of user interfaces to facilitate interaction between a user and any component coupled to the map component 102. As depicted, the presentation component 604 is a separate entity that can be utilized with the map component 102. However, it is to be appreciated that the presentation component 604 and/or similar view components can be incorporated into the map component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the map component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
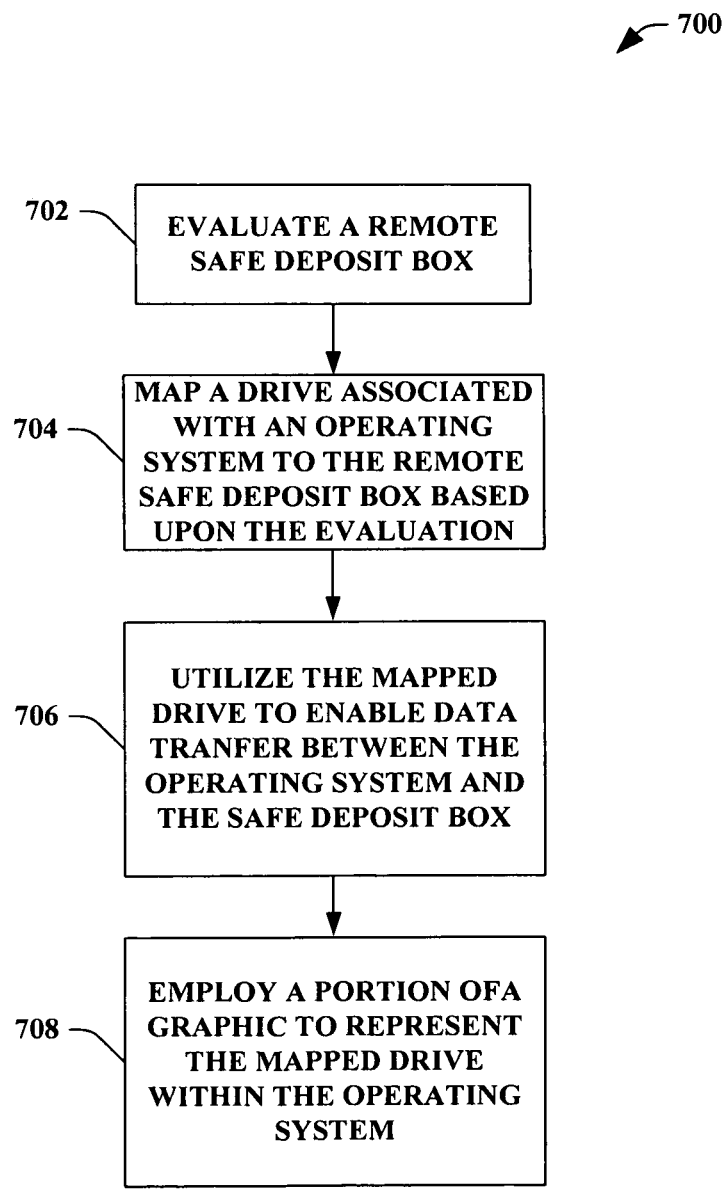
FIG. 7 illustrates an exemplary methodology for integrating an online data storage system with a local operating system (OS).
Figure 8:
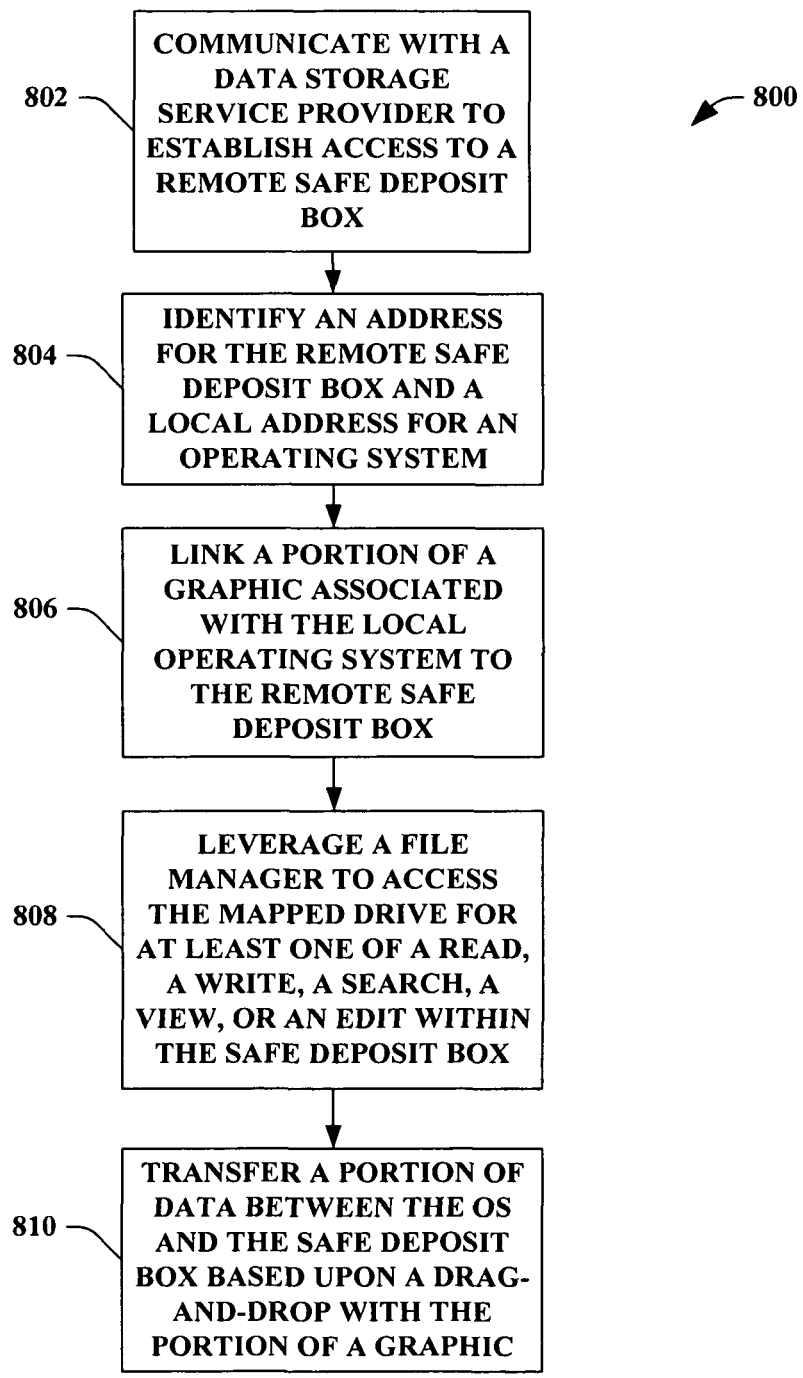
FIG. 8 illustrates an exemplary methodology that facilitates seamlessly incorporating an online data store into an operating system (OS) in which management for data and the online data store can be employed.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates integrating an online data storage system with a local operating system (OS). At reference numeral 702, a safe deposit box can be evaluated. For example, the safe deposit box can be evaluated to identify host, service provider, host address, Internet Protocol (IP) address, account information (e.g., safe deposit box size, contract length, etc.), local address for the operating system 106, remote address for the safe deposit box, username, password, security settings, etc. At reference numeral 704, a drive associated with an operating system can be mapped to the remote safe deposit box based upon the evaluation and/or collected information.

At reference numeral 706, the mapped drive can be utilized to enable data transfer between the operating system and the safe deposit box. For example, data associated with the operating system and/or device utilizing the operating system can be uploaded to the safe deposit box with the mapped drive. Moreover, the mapped drive can be utilized to download data from the safe deposit box to the operating system and/or a device related to the operating system. At reference numeral 708, a portion of a graphic can be employed to represent the mapped drive within the operating system. In other words, the portion of the graphic (e.g., icon, shortcut, graphic, etc.) can be utilized to interact with the safe deposit box from within the operating system environment.

FIG. 8 illustrates a method 800 for seamlessly incorporating an online data store into an operating system (OS) in which management for data and the online data store can be employed. At reference numeral 802, access to a remote safe deposit box can be established based upon a communication with a data storage service provider. At reference numeral 804, an address for the remote safe deposit box and a local address for an operating system can be identified. It is to be appreciated that the address for the remote safe deposit box and the address for the local operating system can be any suitable address that can enable a communications to be established between the operating system and the safe deposit box. For example, the address can be an Internet Protocol (IP) address, a web address, a server, a network address, a hyper text markup language (HTML) address, etc.

At reference numeral 806, a portion of a graphic associated with the local operating system can be linked to the remote safe deposit box. The portion of the graphic can be, for example, an icon, a graphic, a portion of text, a shortcut, an image, a picture, etc. At reference numeral 808, a file manager can be leveraged in order to access the mapped drive for at least one of a read of data, a write of data, a view of data, a search of data, or an edit of data within the safe deposit box. In general, a data manager/application/software/component can incorporate the remote safe deposit box (e.g., and contents) within the operating system. At reference numeral 810, a portion of data can be transferred between the operating system and the safe deposit box based upon a drag-and-drop with the portion of the graphic. Thus, data can be communicated to and from the safe deposit box within the operating system by interacting with the portion of the graphic utilizing a drag-and-drop technique.

Figure 9:
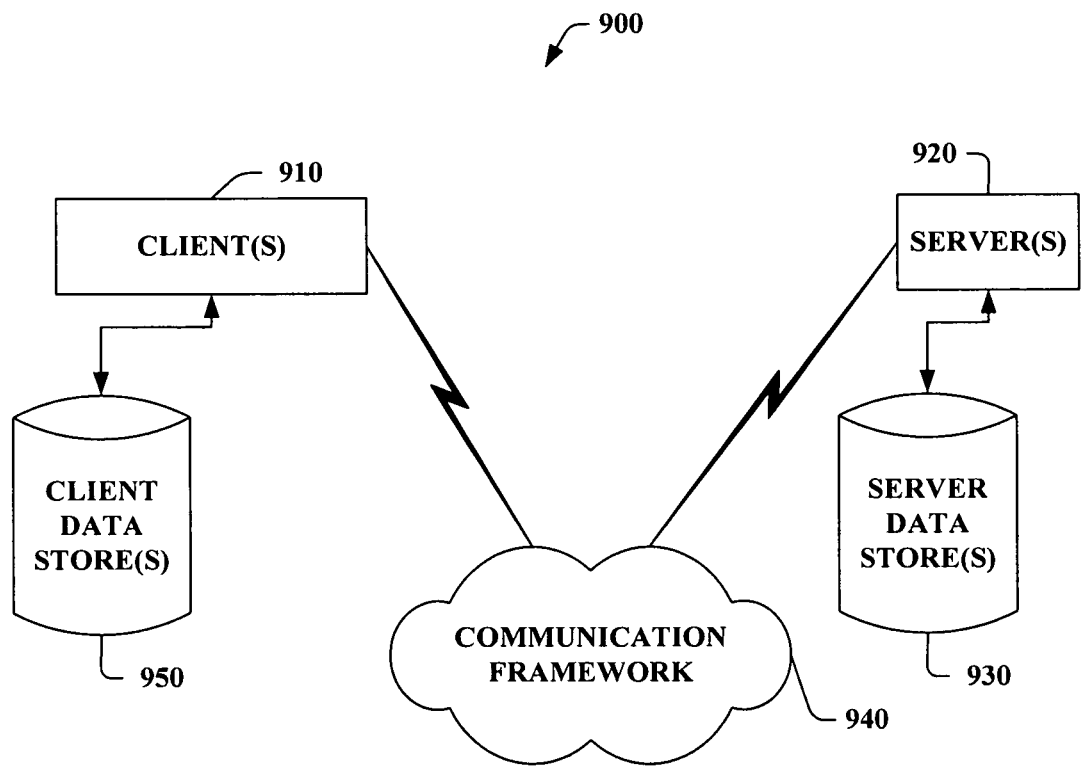
FIG. 9 illustrates an exemplary networking environment, wherein the novel aspects of the claimed subject matter can be employed.
Figure 10:
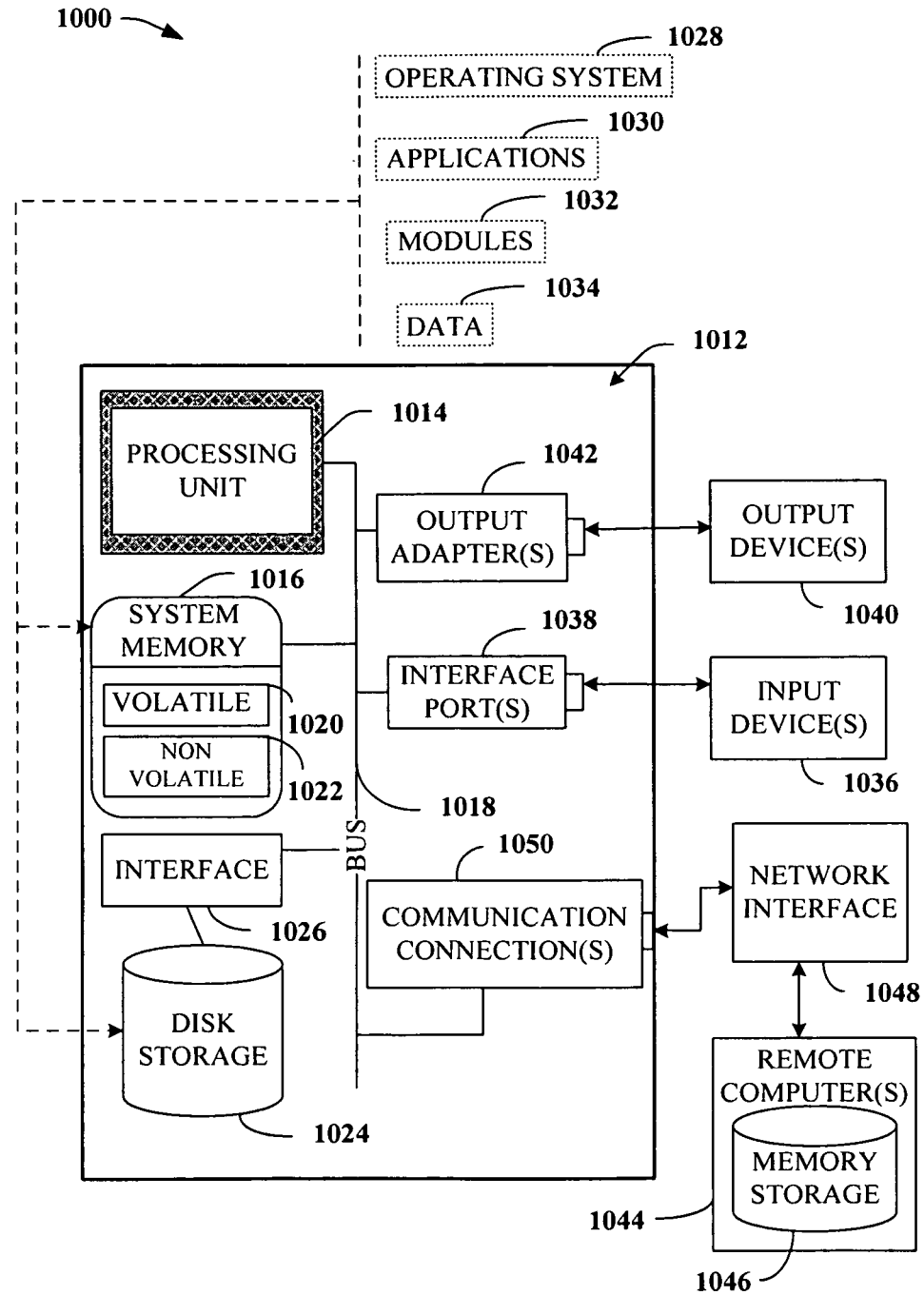
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a map component that can provide a data transfer connection from an operating system (OS) to an online safe deposit box, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
a communication connection that connects the system to an online safe deposit box hosted by a data storage service provider and configured to store a portion of data;
at least one processor configured to execute instructions to implement a local operating system, a map component configured to create a mapped drive that integrates the online safe deposit box within the local operating system to enable data interaction between the local operating system and the online safe deposit box, the data interaction including a data upload from the local operating system to the online safe deposit box in response to a manipulation of a graphical representation of a portion of data for upload and a portion of a graphic representing the online safe deposit box, the map component being further configured to receive an input, to specify a plurality of devices authorized to map to the online safe deposit box in response to the input, and to synchronize the data upload with the plurality of devices,
a size of the online safe deposit box and a data storage service provider of the online safe deposit box being accessible via manipulation of the portion of the graphic representing the online safe deposit box; and
an intelligent component utilized by the map component to facilitate incorporating the safe deposit box into the operating system by generating a probability distribution over a set of states of at least one of the operating system and an environment based on a set of observed events.

2. The system of claim 1, the local operating system and the map component being associated with a device including at least one of a computer, a laptop, a portable digital assistant (PDA), a mobile device, a smartphone, a cellular device, a portable gaming device, a media player, a web browser, or a machine that leverages an operating system.

3. The system of claim 1, the local operating system including at least one of a GUI (graphical user interface)-based operating system (OS), a GUI shell operating system (OS), a 32-bit operating system, a 64-bit operating system, a GUI-based operating system that is remotely utilized, a data synchronization operating system (OS) that leverages a GUI and enables sharing of data across multiple devices, a data synchronization operating system that leverages a GUI and enables data sharing across multiple users, or an operating system (OS) that maps a network drive for integrated accessibility.

4. The system of claim 1, the data interaction being implemented without a repetitive requirement associated with the data storage service provider (SP), the repetitive requirement including at least one of accessing a website associated with the SP, interacting with a network associated with the SP, accessing a server associated with the SP, an SP-related username input, or an SP-related password input.

5. The system of claim 1, the map component being configured to employ a portion of a graphic to represent a connection between the mapped drive within the local operating system and the online safe deposit box.

6. The system of claim 5, the portion of the graphic including at least one of an icon, a shortcut, an image, a graphic, a portion of text, or a picture.

7. The system of claim 1, the manipulation including a drag-and-drop operation.

8. The system of claim 1, the map component being further configured to enable a data download from the online safe deposit box to the local operating system.

9. The system of claim 1, further comprising a search component configured to implement file management locally on a device utilizing the local operating system.

10. The system of claim 9, the search component being further configured to enable file management within the online safe deposit box based at least in part upon the created mapped drive.

11. The system of claim 10, the search component being further configured to manage data with at least one of a creation of data, a deletion of data, a read/view of data, a copy of data, a transfer of data, or an edit of data, the managed data being located on at least one of the online safe deposit box or on the device utilizing the local operating system.

12. The system of claim 1, further comprising a box manager to configure a setting related to the online safe deposit box locally on a device utilizing the local operating system.

13. The system of claim 12, the setting including at least one of a quota management, a contract/service adjustment, an account history, a type of service, an extend contract service agreement, a decrease contract service agreement, a billing setting, a payment, a fee, a portion of account information, a payment type, a portion of bank information, a portion of credit card information, a portion of personal information, a personal address, a contact preference, a notification setting, a username, a password, a portion of contact information, an email address, a data storage setting, an automatic backup setting, a type of data to store, a sharing setting, a security, a data storage allocation, a mapping/linking setting, or an authorization of a device to map.

14. The system of claim 1, the map component being further configured to integrate the online safe deposit box into a device utilizing the local operating system within at least one of the following: a file manager component as a mapped drive; a local machine workspace; a backup application; or a data synchronization operating system that shares data across multiple devices.

15. The system of claim 1, the map component being configured to evaluate the online safe deposit box to identify at least one of a host, a service provider, a host address, an Internet Protocol (IP) address, an account information, a local address for the operating system, a remote address for the safe deposit box, a username, a password, or a security setting.

16. The system of claim 1, further comprising a cloud configured to host at least one of the map component or the online storage deposit box.

17. A computer-implemented method, comprising transferring data between devices connected via a network, using operations including:
   evaluating a remote safe deposit box storage device;
   generating a probability distribution over a set of states of at least one of an operating system and an environment based on a set of observed events;
   mapping a drive associated with the operating system to the remote safe deposit box storage device based upon the evaluating and the probability distribution;
   specifying a plurality of devices authorized to map to the remote safe deposit box in response to an input;
   transferring a portion of data from the operating system to the remote safe deposit box storage device based upon a drag-and-drop operation interacting with a portion of a graphic representing the mapped drive within the operating system, a size of the remote safe deposit box and a location of the remote safe deposit box being accessible via manipulation of the portion of the graphic representing the mapped drive; and
   synchronizing the portion of data to the plurality of devices.

18. The method of claim 17, further comprising:
   communicating with a data storage service provider to establish access to the remote safe deposit box from within the operating system; and
   identifying an address for the remote safe deposit box and a local address for the operating system.

19. The method of claim 17, further comprising leveraging a file manager to access the mapped drive from within the operating system for at least one of a read, a write, a search, a view, or an edit of a portion of data within the remote safe deposit box.

20. A computer-readable storage medium storing instructions, the instructions configured to, in response to execution by at least one computing device, perform operations comprising:
   storing a portion of data within an online safe deposit box;
   hosting the online safe deposit box with a data storage service provider;
   leveraging a graphical user interface (GUI) within a local operating system to interact with a portion of data;
   identifying a mapping between the local operating system and the online safe deposit box employing a probability distribution over a set of states of at least one of the local operating system and an environment based on a set of observed events;
   creating a mapped drive that integrates the online safe deposit box within the local operating system to enable data interaction between the local operating system and the online safe deposit box, the data interaction including a data upload from the local operating system to the online safe deposit box;
   leveraging a file manager to access the mapped drive from within the local operating system for at least one of a read, a write, a search, a view, or an edit of a portion of data within the online safe deposit box;
   employing a portion of a graphic to represent the mapped drive within the local operating system, a size of the online safe deposit box and a data storage service provider of the online safe deposit box being discoverable via manipulation of the portion of the graphic representing the online safe deposit box;
   specifying a plurality of devices authorized to map to the online safe deposit box in response to an input;
   transferring a portion of data between the local operating system and the online safe deposit box based upon a drag-and-drop operation interacting with the portion of the graphic; and
   synchronizing the portion of data to the plurality of devices.

* * * * *